(12) United States Patent
Strawn

(10) Patent No.: US 8,713,774 B2
(45) Date of Patent: May 6, 2014

(54) SYSTEM AND METHOD OF RAPID MODEL VEHICLE CONSTRUCTION

(75) Inventor: Curtis Strawn, Torrance, CA (US)

(73) Assignee: Honda Motor Co., Ltd., Tokyo (JP)

( * ) Notice: Subject to any disclaimer, the term of this patent is extended or adjusted under 35 U.S.C. 154(b) by 338 days.

(21) Appl. No.: 13/076,824

(22) Filed: Mar. 31, 2011

(65) Prior Publication Data

US 2012/0246903 A1 Oct. 4, 2012

(51) Int. Cl.
*B23P 9/00* (2006.01)
(52) U.S. Cl.
USPC .......... 29/281.1; 29/445; 269/289 R; 269/900
(58) Field of Classification Search
USPC ................ 29/445, 897.2, 721, 771, 783, 557, 29/281.5, 281.1, 464, 466, 468; 269/289 R, 269/900; 264/400, 482; 409/131–132; 451/5, 10, 11; 219/69.11, 69.17, 69.1, 219/121.65, 121.66, 121.68, 121.69, 219/121.39, 121.4, 121.41, 121.73, 121.85
See application file for complete search history.

(56) References Cited

U.S. PATENT DOCUMENTS

| | | | | |
|---|---|---|---|---|
| 4,555,836 A | * | 12/1985 | Martin | 29/428 |
| 4,867,922 A | * | 9/1989 | Zuccato | 264/40.1 |
| 5,027,496 A | | 7/1991 | Zuccato | |
| 5,231,749 A | * | 8/1993 | Hutchison | 29/407.1 |
| 5,774,969 A | | 7/1998 | Zuccato | |
| 6,324,750 B1 | | 12/2001 | Saunders et al. | |
| 6,941,188 B1 | | 9/2005 | Arnold, II | |
| 7,447,616 B2 | | 11/2008 | Wang et al. | |

* cited by examiner

*Primary Examiner* — David Bryant
*Assistant Examiner* — Steven A Maynard
(74) *Attorney, Agent, or Firm* — Standley Law Group LLP

(57) ABSTRACT

Systems and methods of rapid model vehicle construction. The invention substitutes large and unitary model vehicle sections for the greater number of individual model vehicle components used in known model vehicle construction techniques. Further, substantially the entire exterior of a model vehicle is created from the collective non-machined or substantially non-machined exterior portions of interlocked model vehicle sections.

14 Claims, 15 Drawing Sheets

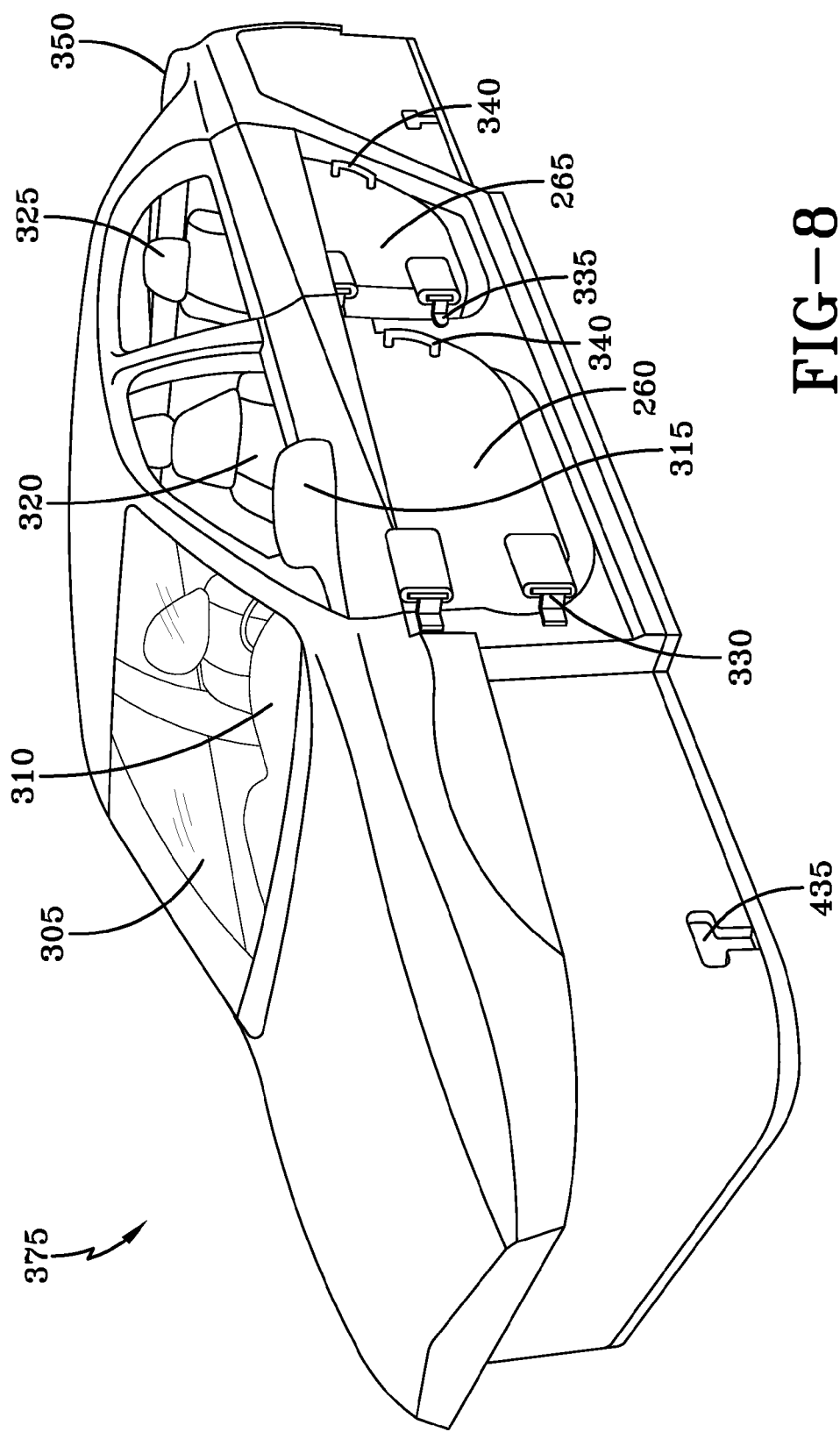

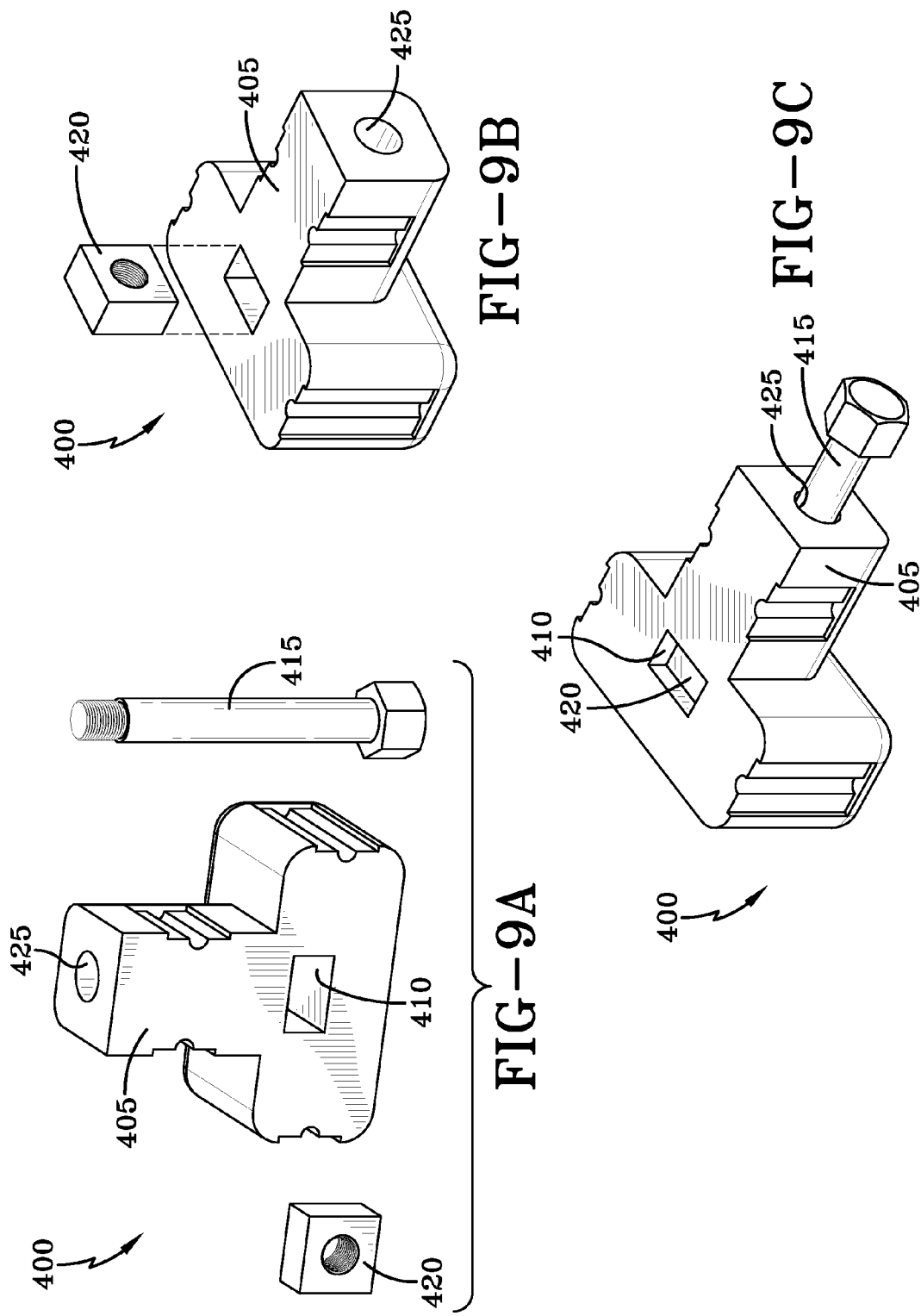

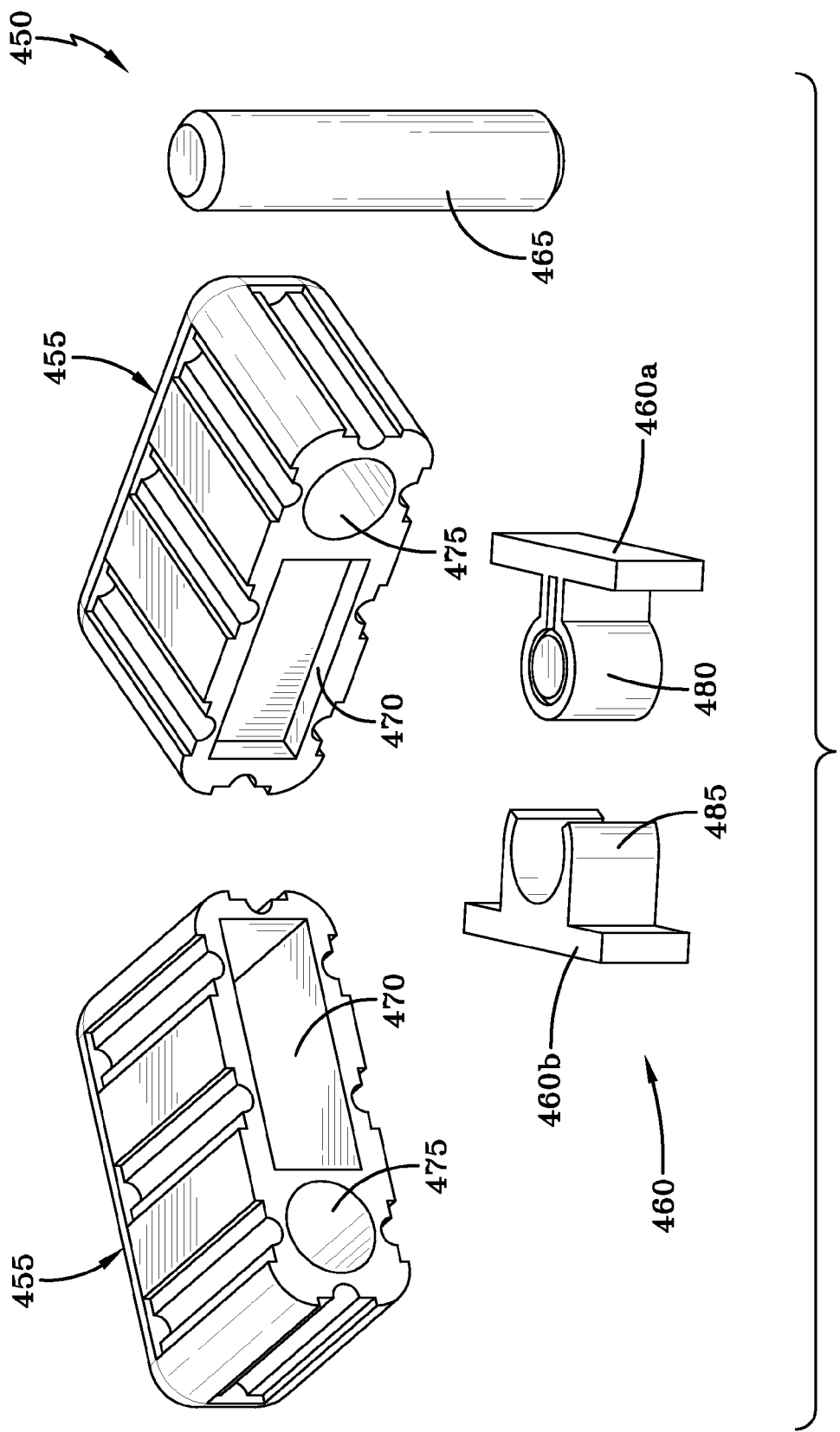

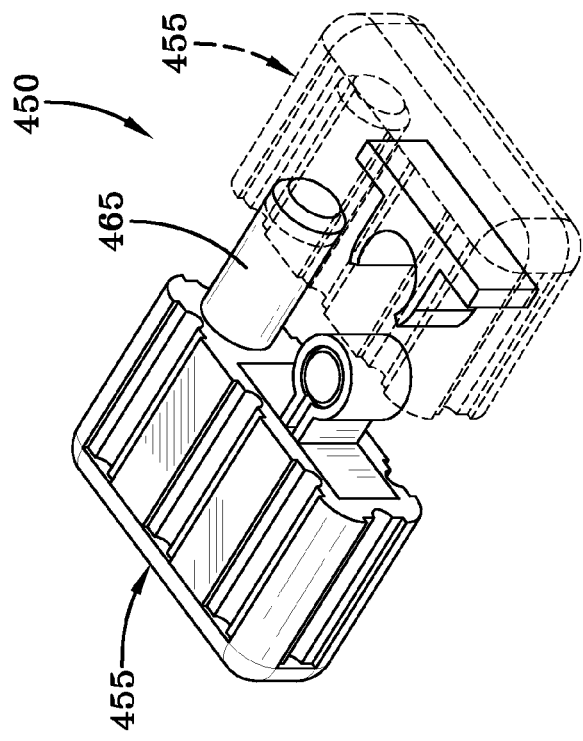
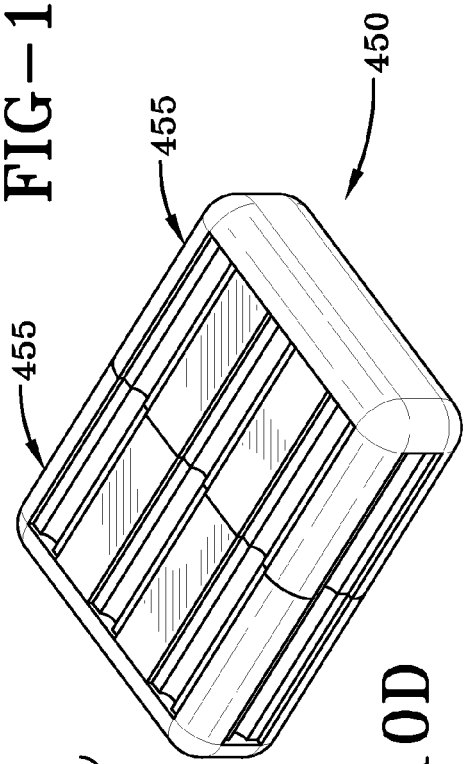
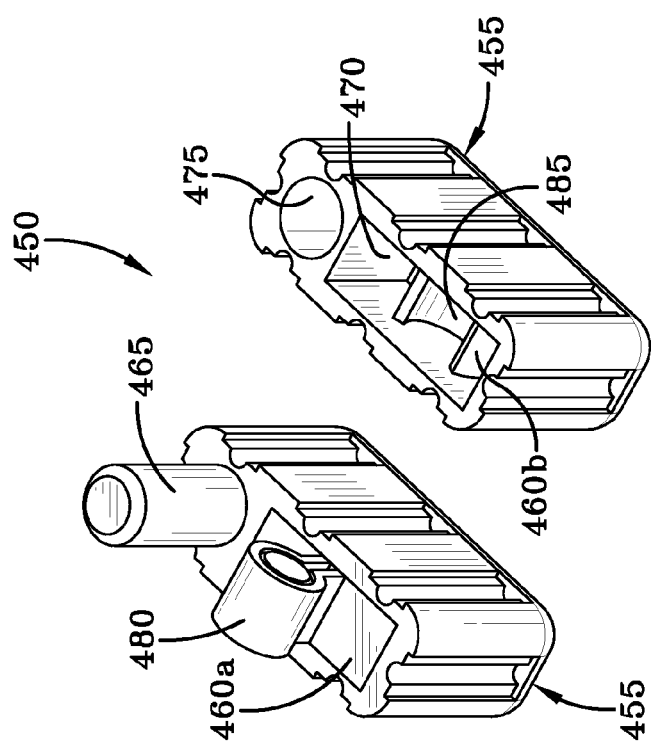
FIG-10C
FIG-10D
FIG-10B

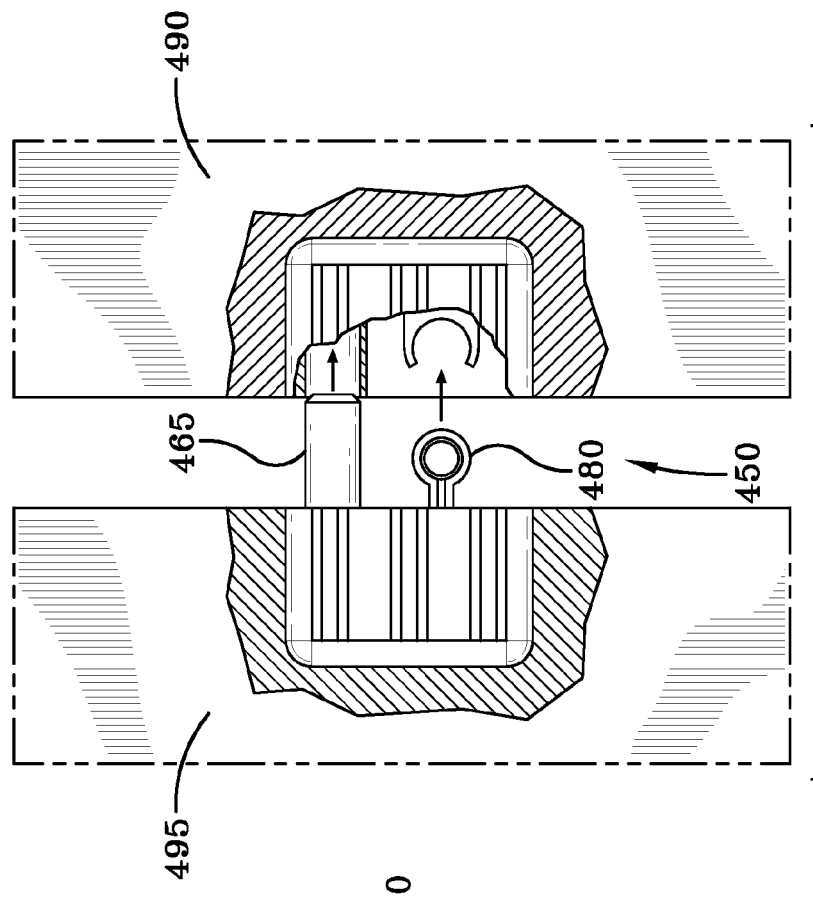
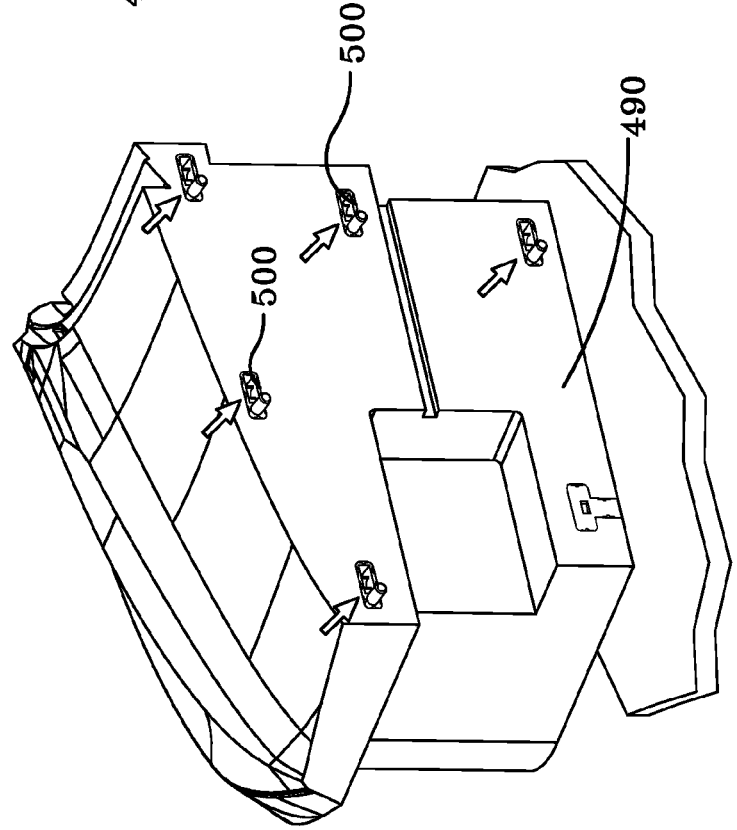

SYSTEM AND METHOD OF RAPID MODEL VEHICLE CONSTRUCTION

TECHNICAL FIELD

The present invention is directed to a system and method for rapidly and efficiently creating a model of a vehicle. The model may be a full size, dimensionally accurate model.

BACKGROUND

As vehicle manufacturers develop new vehicles or modify (update) existing vehicles, a model is typically created during the design and development process. This is especially true with respect to the design and development of new vehicles. In fact, multiple model vehicles may be created during this process. Model vehicles may be used for a variety of purposes including, but not limited to, evaluating the aesthetic appearance of the vehicle exterior and/or interior, evaluating vehicle ergonomics such as ingress/egress, control layout and position, and passenger room, as well as for checking visibility and sight lines. As can be understood, it is often desirable that a model vehicle be as accurate as possible in appearance, in dimension, and in spatial relationship between features and components.

Various techniques exist for creating model vehicles. For many years, and especially prior to the advent of computer aided design (CAD) and computer aided engineering (CAE) techniques, model vehicles were largely sculpted from large blocks of clay or from clay layered over a rough sub-structure of wood or other substantially rigid material. Clearly, such a modeling technique is not only time consuming, it is also costly and requires the use of highly skilled and highly practiced craftsmen.

Although clay modeling is still used, other vehicle modeling techniques have been developed, many of which rely on digital data obtained from CAD and/or CAE systems used to design and develop the vehicle of interest. In these model vehicle building techniques, the digital model data may be supplied to various automated machinery that can use the digital data to produce model vehicle components from supplied specimens of some machinable material.

Despite the use of these digital data-based model construction techniques, the creation of model vehicles has nonetheless remained a fairly laborious and complex process—particularly when a full size, substantially complete and dimensionally accurate model vehicle is desired or necessary. Particularly, even these known digital data-based modeling techniques normally require the construction of a multi-piece base platform (e.g., floor pan) upon which other model components are installed. These known techniques also generally require that the remaining components necessary to complete the model vehicle (e.g., hood, roof, deck lid, pillars, doors, fenders, quarter panels, etc.) be individually created and subsequently affixed to the base platform and to each other. While these known digital data-based modeling techniques are quicker and no doubt more dimensionally accurate than clay modeling or other more rudimentary modeling techniques, such digital data-based modeling techniques are still costly and require the expenditure of a large number of man and machine hours.

Therefore, it should be apparent that a more efficient and cost effective technique of model vehicle construction would be desirable and advantageous. A rapid model vehicle construction system and method of the present invention provides such a technique.

SUMMARY OF THE GENERAL INVENTIVE CONCEPT

The present invention is directed to a streamlined system and method for creating a model vehicle. The invention uses low cost, high-strength materials to form the various components of the model vehicle. A base is first prepared, as with known model vehicle building techniques. However, as with other portions of the model vehicle, the number of individual components used to form the base is greatly reduced in comparison to known modeling techniques. The base is preferably also built using a material such a sandwiched foam structure that eliminates the need for significant bracing or layering.

The base serves as the mounting platform for many of the remaining model vehicle sections. The remainder of the model vehicle is divided into large sections that are unitarily machined from large blocks of a machinable material (e.g., foam). For example, an entire driver or passenger side of the model vehicle may be created as a single unit (section) by an automated machining device operating under digital control.

Each of the model sections that so require first have corresponding interior contours machined therein, after which interior finishes (e.g., paint, fabrics, etc.) may be applied thereto. The sections are then assembled to the base or to a temporary base substitute (fixture) and interlocked with each other. Special fasteners may be used for this purpose.

After initial assembly to the base or to a substitute fixture, the interlocked sections are collectively machined in place to form the exterior surfaces of the model vehicle body. To this end, the individual model vehicle sections are provided with sufficient or excess machinable material along an exterior side thereof. In the case where the interlocked sections are collectively machined while attached to a base substitute fixture, the interlocked and machined sections are subsequently removed from the fixture and transferred to the base as one coherent body.

Consequently, it can be understood that systems and methods of the present invention substitute large and unitary model vehicle sections for the greater number of individual model vehicle components used in known model vehicle construction techniques. Further, unlike known model vehicle construction techniques, systems and methods of the present invention create substantially the entire exterior of a model vehicle from the non-machined or substantially non-machined exterior portions of the interlocked model sections. Therefore, systems and methods of the invention are able to significantly reduce the number of man and machine hours required to create a model vehicle, which also result in a reduced cost.

BRIEF DESCRIPTION OF THE DRAWINGS

In addition to the features mentioned above, other aspects of the present invention will be readily apparent from the following descriptions of the drawings and exemplary embodiments, wherein like reference numerals across the several views refer to identical or equivalent features, and wherein:

FIG. 8 depicts a completely assembled model vehicle;

FIGS. 9A-9E illustrate one exemplary specialized fastener device and its method of use in securing sections of a model vehicle constructed according to the present invention; and FIGS. 10A-10F illustrate another exemplary specialized fastener device and its method of use in interlocking sections of a model vehicle constructed according to the present invention.

DETAILED DESCRIPTION OF EXEMPLARY EMBODIMENT(S)

Figure 1A:
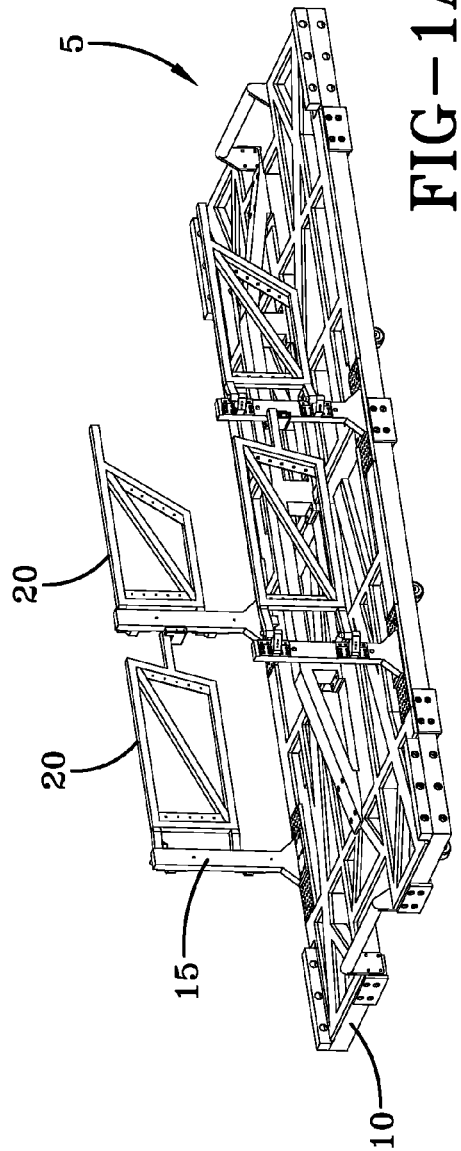
FIGS. 1A-1D schematically illustrate a number of individual model vehicle components that are required to create an exemplary model vehicle according to a known model vehicle construction technique.

A known technique for constructing a model vehicle is schematically illustrated in FIGS. 1A-1D. As shown in FIG. 1A, model construction according to this technique typically begins with the fabrication of a custom steel base frame 5. The base frame 5 may include, for example, a floor frame portion 10, door support pillars 15, and door frames 20.

Figure 1B:
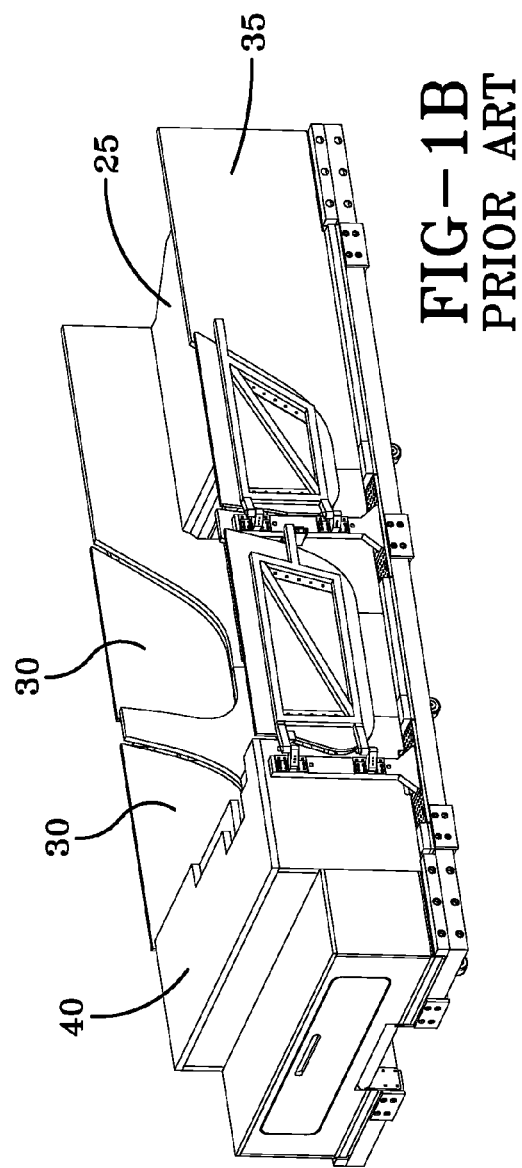

As depicted in FIG. 1B, once the base frame 5 has been fabricated, floor construction follows. The model floor generally includes several substantially flat floor surfaces 25 to which seats and other components may be mounted. The model floor also typically includes, without limitation, interior door skins 30, interior rear quarter skins 35, and a simulated instrument panel component mounting structure 40. Other components/structures may also be included. In any event, each of the model floor components is typically hand constructed (such as from plywood) and individually fit and secured to the steel base frame 5.

Figure 1C:
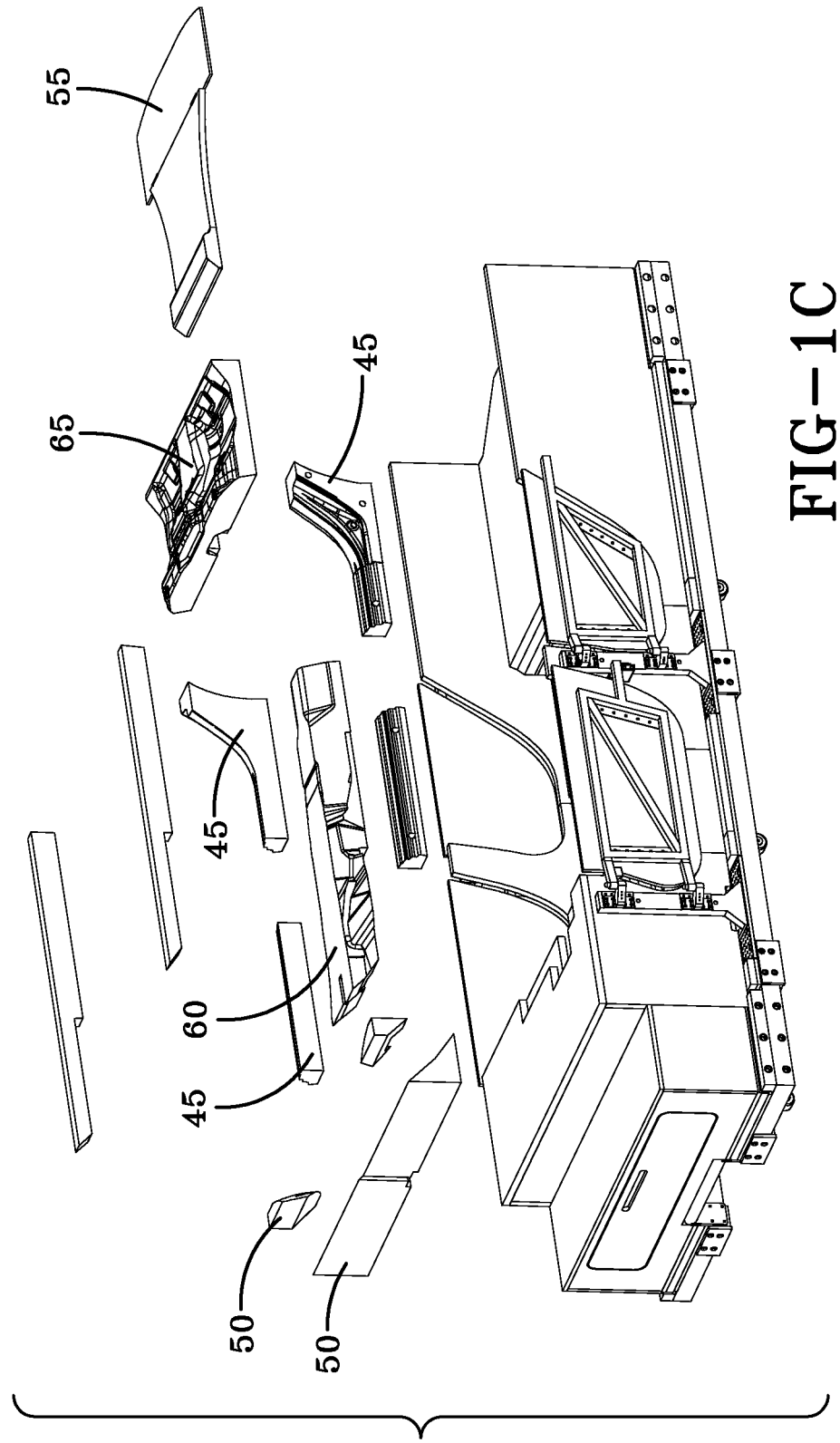
Figure 1D:
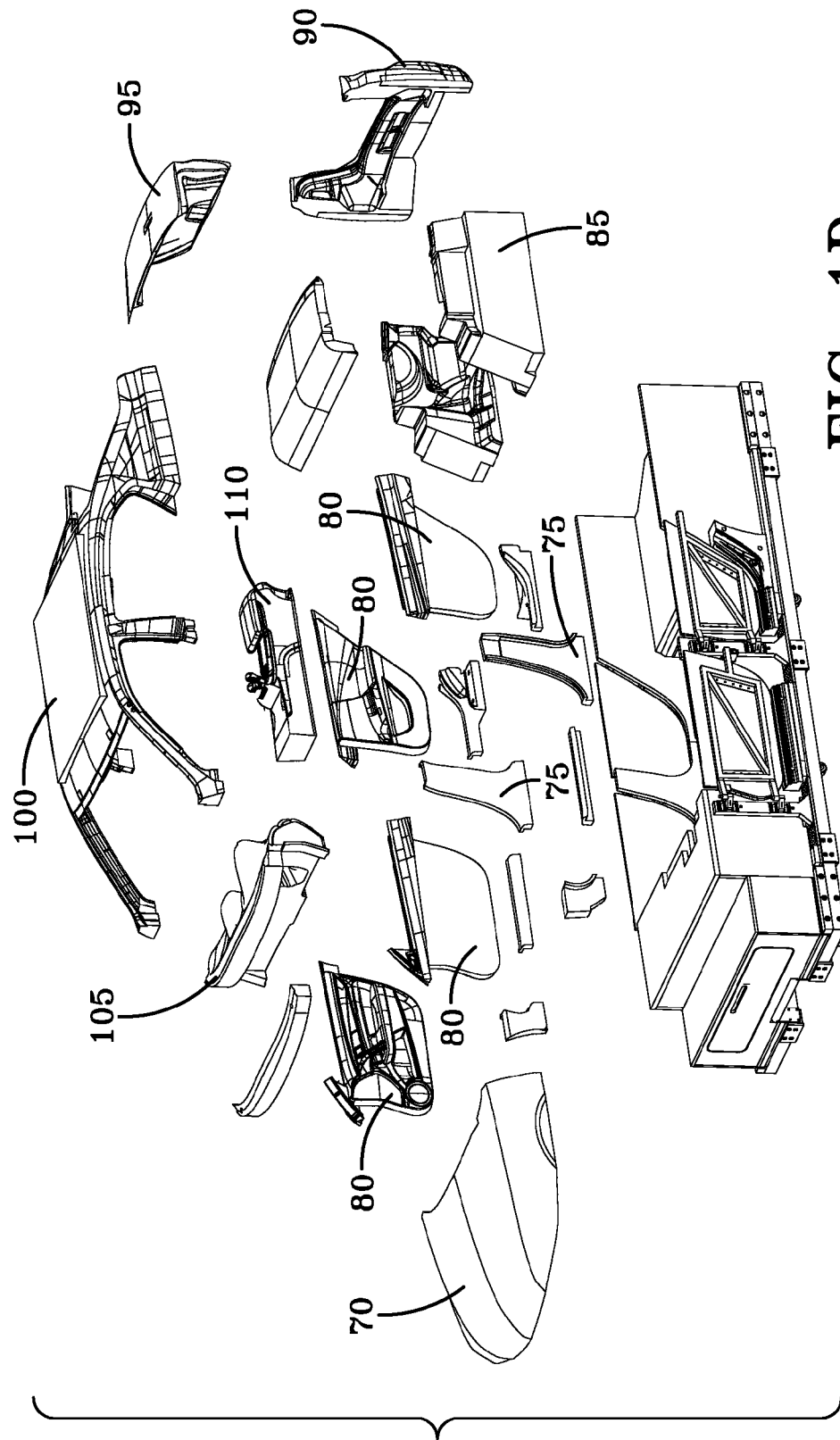

FIG. 1C illustrates the next step of model construction according to this known technique, which entails the fabrication and installation of various floor surface parts. Typical floor surface parts may include, for example, door sills 45, foot well trim elements 50, contoured trunk shelf elements 55, a center console base element 60, a rear seat contour element 65, etc. The floor surface parts may be milled or otherwise formed from a machinable material. As with the model floor components of FIG. 1B, each of the floor surface parts is typically individually fit and secured to the steel base frame 5—typically with the assistance of a digital layout machine or some other location verification device.

Upon completion of floor surface part installation, a multitude of design surface components may be fabricated and individually fit and secured to the base frame 5. As is shown in the exemplary model of FIG. 1D, these design surface components may include, without limitation, a hood 70, exterior door pillars 75, exterior door skins 80, exterior quarter panels 85, a rear deck lid 95, a roof with separate or (in this case) attached roof pillars 100, and various interior surface components such as an instrument panel 105 and a center console unit 110. All of these design surface components must be individually fit and secured to the base frame 5, and/or to corresponding floor surface parts, and/or to each other.

It can be clearly understood from FIGS. 1A-1D and the foregoing description, that constructing a model vehicle by this known technique requires the fabrication of a large number of individual components, as well as the hand fitting and assembly of these components to the base frame and/or to other components already secured thereto. Consequently, it can also be understood that constructing a model vehicle according to this known technique is a time consuming and costly process that undesirably lends itself to various component fit/location problems. Therefore, the desirability and benefit of the improved model vehicle construction techniques of the present invention should be apparent.

Figure 2:
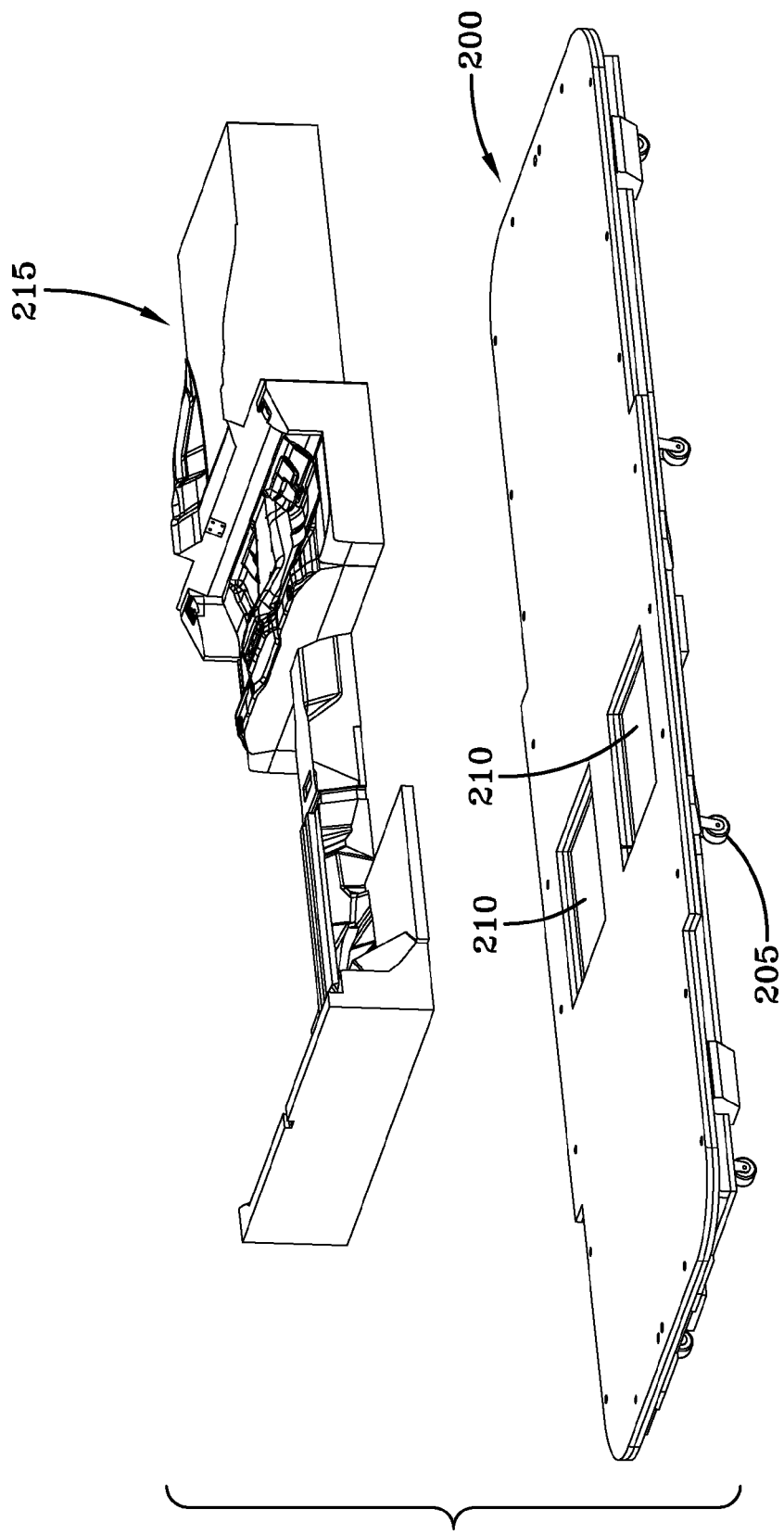
FIG. 2 depicts an exemplary base portion of a model vehicle as constructed according to the present invention.
Figure 3:
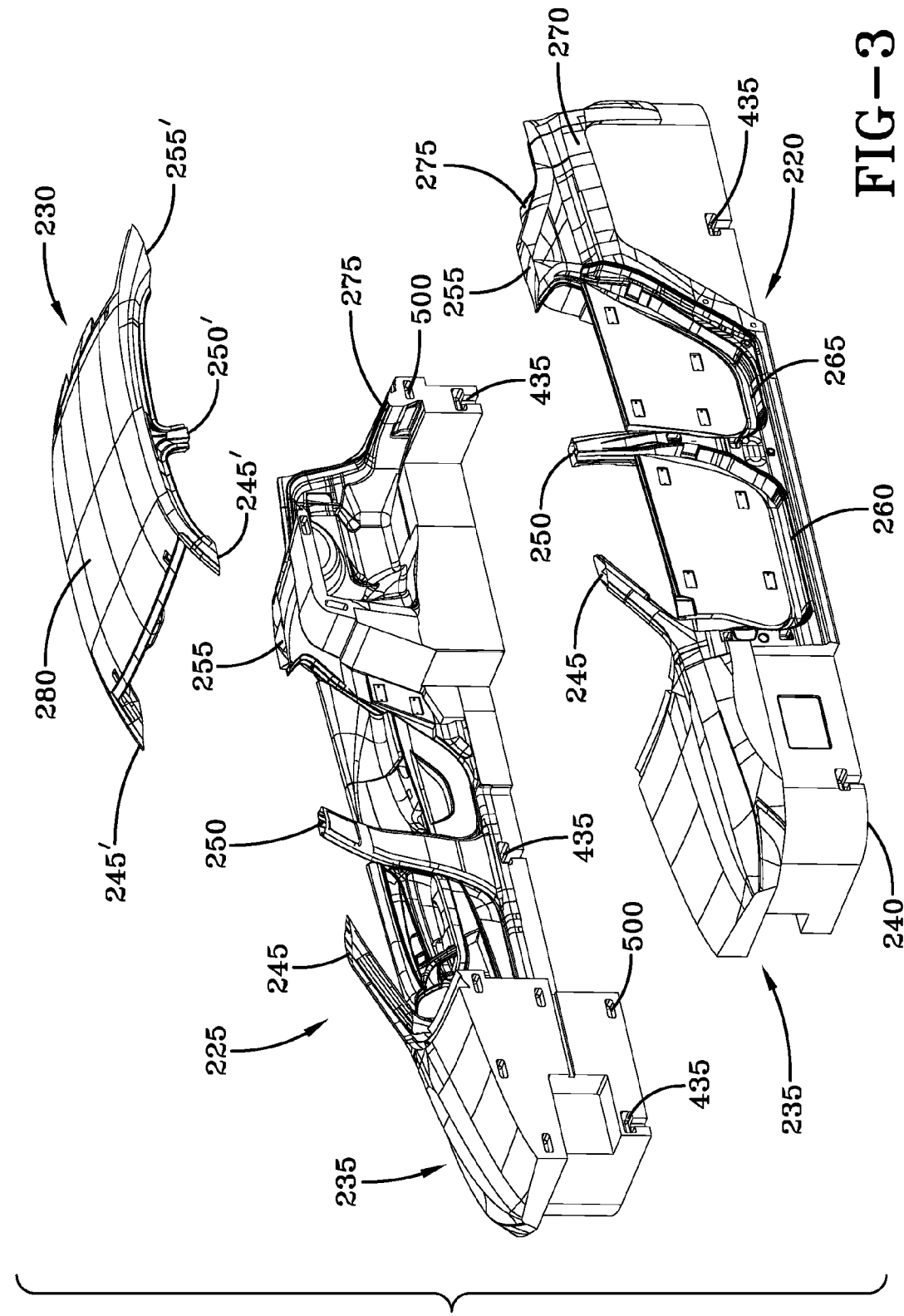
FIG. 3 illustrates a reduced number of exterior design surface components that can be used to build the model of FIG. 1 using a system and method of the present invention.

FIGS. 2-3 schematically illustrate a reduction in individual components required to build the model of FIG. 1 using a system and method of the present invention. As represented in FIG. 2, vehicle model construction according to the present invention generally begins with preparation of a base 200. The base 200 is preferably fabricated from one or more low cost, high-strength materials that eliminate or greatly reduce the need for significant bracing or layering. For example, a base made according to techniques of the present invention may be fabricated from a sandwiched foam structure that includes a foam core material covered on both sides by a plywood skin. A plurality of movement assistive elements such as wheels 205 or rollers may be located along an underside of the base 200 to facilitate later relocation of the vehicle model.

Certain features may be machined or otherwise formed in the base 200. For example, and as shown in FIG. 2, front seat framework mounting recesses 210 may be milled into an upper surface of the base 200. Other features are, of course, also possible. These features may be created in the base 200 at various points of the base fabrication process.

As can be understood from FIG. 2 and from the subsequent drawing figures and description of exemplary embodiments, the base 200 directly or indirectly serves as the mounting platform for the remaining sections used to form a model vehicle according to the present invention.

As illustrated in FIGS. 2-3, the remainder of a model vehicle of the present invention is divided into large sections that are unitarily machined from blocks of a machinable material (e.g., machinable foam). One such section is an interior section 215 that includes a number of exposed contours or other surfaces. These surfaces are generally referred to herein as "design surfaces" and a model vehicle section that carries such a surface(s) may be generally referred to as a "design surface section."

As shown in FIG. 2, this interior design surface section 215 is a unitarily machined single component that incorporates a number of the individual model components of FIGS. 1B-1C. For example, this interior design surface section 215 incorporates the instrument panel component mounting structure 40 and the various floor pan elevations formed by the individual floor sections 25 of FIG. 1B. The interior design surface section 215 also incorporates at least the foot well trim elements 50, contoured trunk shelf element 55, center console base element 60 and rear seat contour element 65 shown in FIG. 1C.

Because the various elements/features of the interior design surface section 215 are machined into one large component, it can be understood that the desired dimensional and spatial relationship between the various elements/features is more easily maintained in comparison to the aforementioned known technique that makes use of a multitude of individual components. Similarly, the use of such a unitary interior design surface section 215 simplifies installation and helps to ensure that each element/feature of the interior section is accurately located with respect to the base and/or to other subsequently installed components/features.

Electronic renderings of several large exterior model vehicle design surface sections are depicted in FIG. 3. In a similar manner to the interior section 215 of FIG. 2, these exterior sections incorporate what would be a plurality of individual components if the same model vehicle were constructed using the aforementioned known construction technique. Specifically, FIG. 3 depicts a driver side design surface section 220, a passenger side design surface section 225, and a roof design surface section 230. As can be observed, each of the driver and passenger side design surface sections 220, 225 of this particular exemplary embodiment terminates substantially along the lengthwise centerline of the vehicle body and includes approximately one half of a hood 235, a portion of a front fender 240, a major portion of an A, B and C roof support pillar 245, 250, 255, front and rear doors 260, 265, a rear quarter panel section 270, and approximately half of a rear clip 275 to which a deck lid, tail lights and/or various other components may be mounted. In other embodiments, the termination point of the driver and passenger side design surface sections may be located at other than the lengthwise centerline of the vehicle body. For example, one of the driver or passenger side design surface sections may have the entire hood and/or rear clip associated therewith, or the dividing line between sections may simply fall some distance to one side or the other of the centerline.

The roof section 230 in this case includes a roof panel 280, as well as smaller corresponding roof pillar portions 245', 250', 255' that are designed to mate with the roof pillar portions 245, 250, 255 of the driver and passenger side design surface sections. In other embodiments, a roof panel may include a different percentage of the overall roof pillar portions or may be wholly devoid of any roof pillar portions—the entirety of the roof pillar portions instead being a part of the driver and passenger side design surface sections.

As depicted in FIG. 3, each of these exterior design surface sections 220, 225, 230 also include interior (backside) mounting surfaces and/or interior contours (generically, "backside surfaces") machined therein. For example, these sections 220, 225, 230 may include design elements such as interior door sills, arm rests, pillar trim, a number of component mounting surfaces and various other features that would otherwise be comprised of separate components if a vehicle model were constructed using known techniques.

Figure 4:
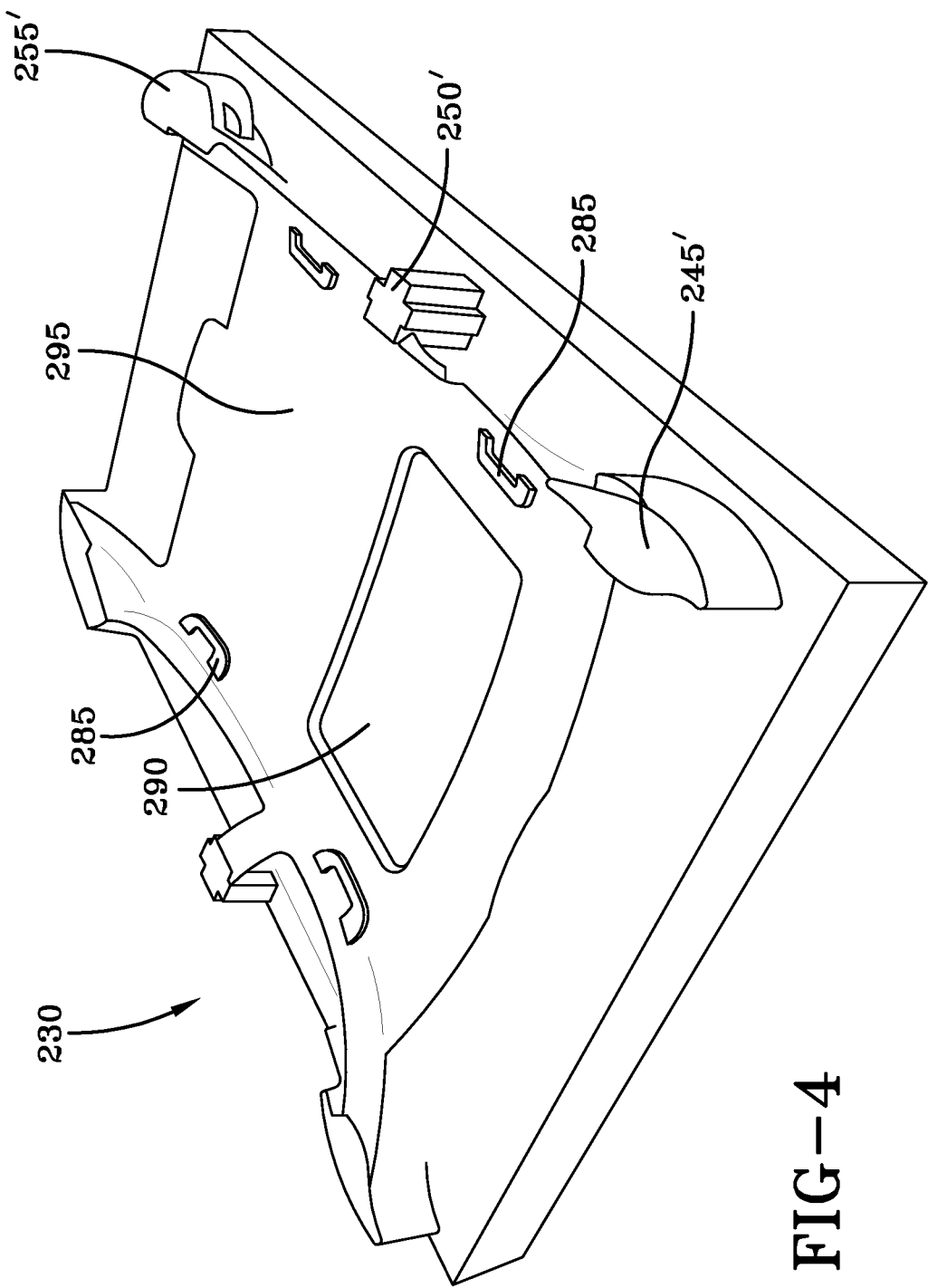
FIG. 4 shows one exemplary model vehicle section with interior contours machined therein according to the present invention.

The creation of various exemplary backside surfaces in an exemplary exterior design surface section is illustrated in FIG. 4. In this case, the roof design surface section 230 of FIG. 3 is shown after partial machining. More particularly, the roof design surface section 230 can be seen to be comprised of a large block of machinable material (e.g., foam) into which various backside surfaces have been machined. In this particular example, the backside surfaces include the general shape of the vehicle headliner 295, simulated interior grab handles 285 and a sunroof 290. The backside surfaces of the roof design surface section 230 have also been provided with an interior finish which, in this case, is paint. Other interior finishes such as fabric, leather, vinyl, etc., may also be applied after creation of the backside surfaces. As shown, the roof pillar portions 245', 250' and 255' have also been machined from the block of material. While particular exemplary backside surfaces are shown in FIG. 4 for purposes of illustration, it should be apparent that the backside surfaces placed into a given design surface section may vary greatly by section type and by vehicle design.

Figure 5:
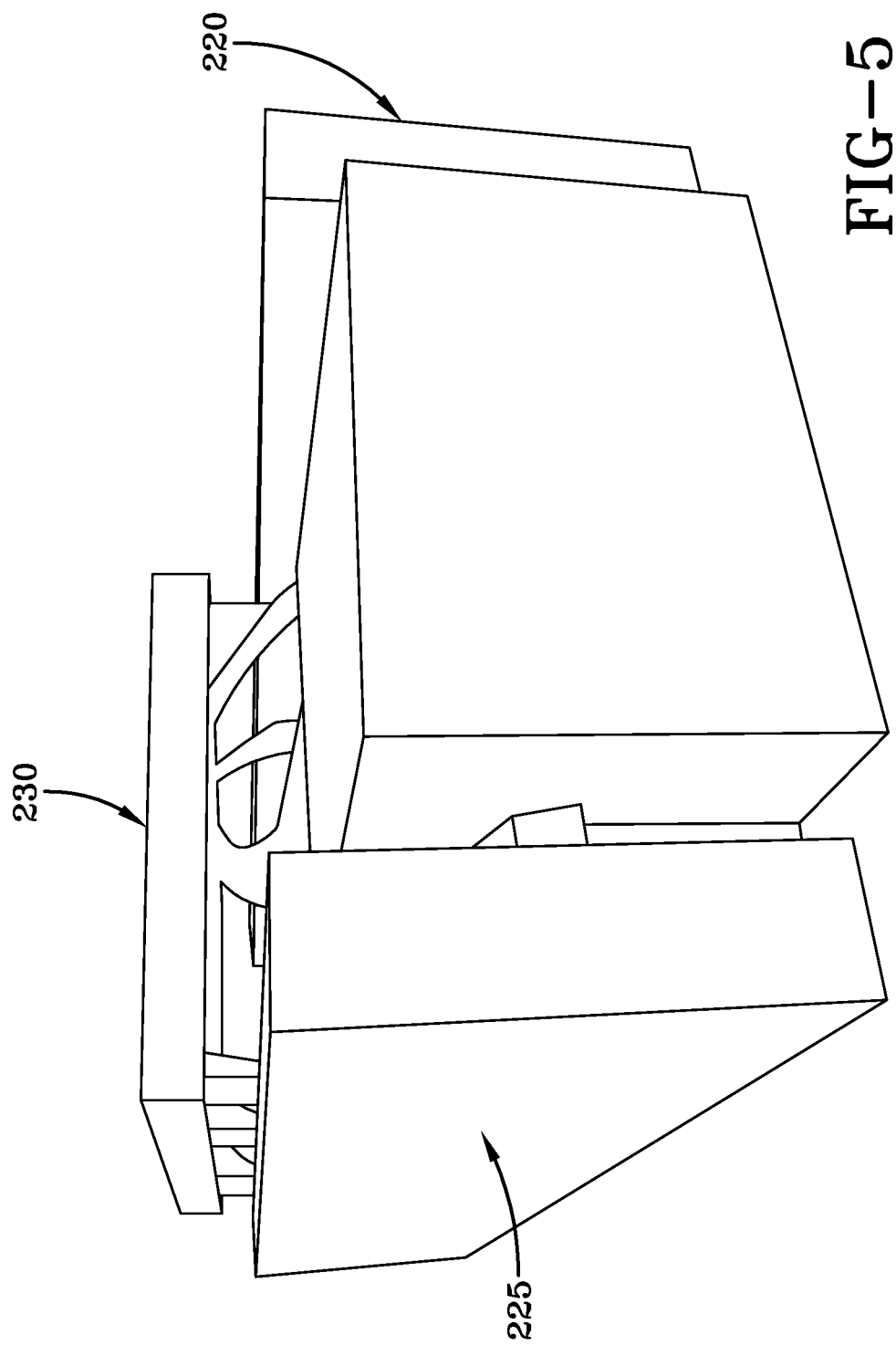
FIG. 5 shows the various model vehicle sections of an exemplary model vehicle affixed to a base and connected to each other according to the present invention.

As should be apparent from FIG. 4, and certainly from FIG. 5, the various design surface sections that are used to create an overall model vehicle are provided with ample material from which to also machine the desired exterior vehicle surfaces. For example, it can be observed in FIG. 4 that, other than the already machined backside surfaces 285, 290, 295 and the roof pillar portions 245', 250' and 255', the roof design surface section 230 is otherwise a substantially rectangular block of machinable material.

Referring now to FIG. 5, initial assembly of the various design surface sections 220, 225, 230 to the base 200 is depicted. It should be realized that at this stage of the model vehicle construction process, each of the design surface sections has already had desired backside surfaces machined therein. For example, roof pillar portions 245, 250, 255 can be observed to extend upward from the driver and passenger side design surface sections 220, 225, and mating roof pillar portions 245', 250', 255' can be observed to extend downward from the roof design surface section 230. Non-visible backside surfaces may also include, without limitation, the contoured, mounting and/or mating surfaces shown in FIG. 3.

As shown in FIG. 5, the various design surface sections 220, 225, 230 have been assembled to the base 200 and interlocked with each other, such as by means of various fasteners. Certain embodiments of fasteners developed for this purpose are shown in FIGS. 9A-9B and described below, although the present invention is not necessarily limited to the use of these fasteners. With the design surface sections 220, 225, 230 assembled to the base 200 and interlocked as shown, the initially assembled model is ready for exterior surface machining.

Figure 6:
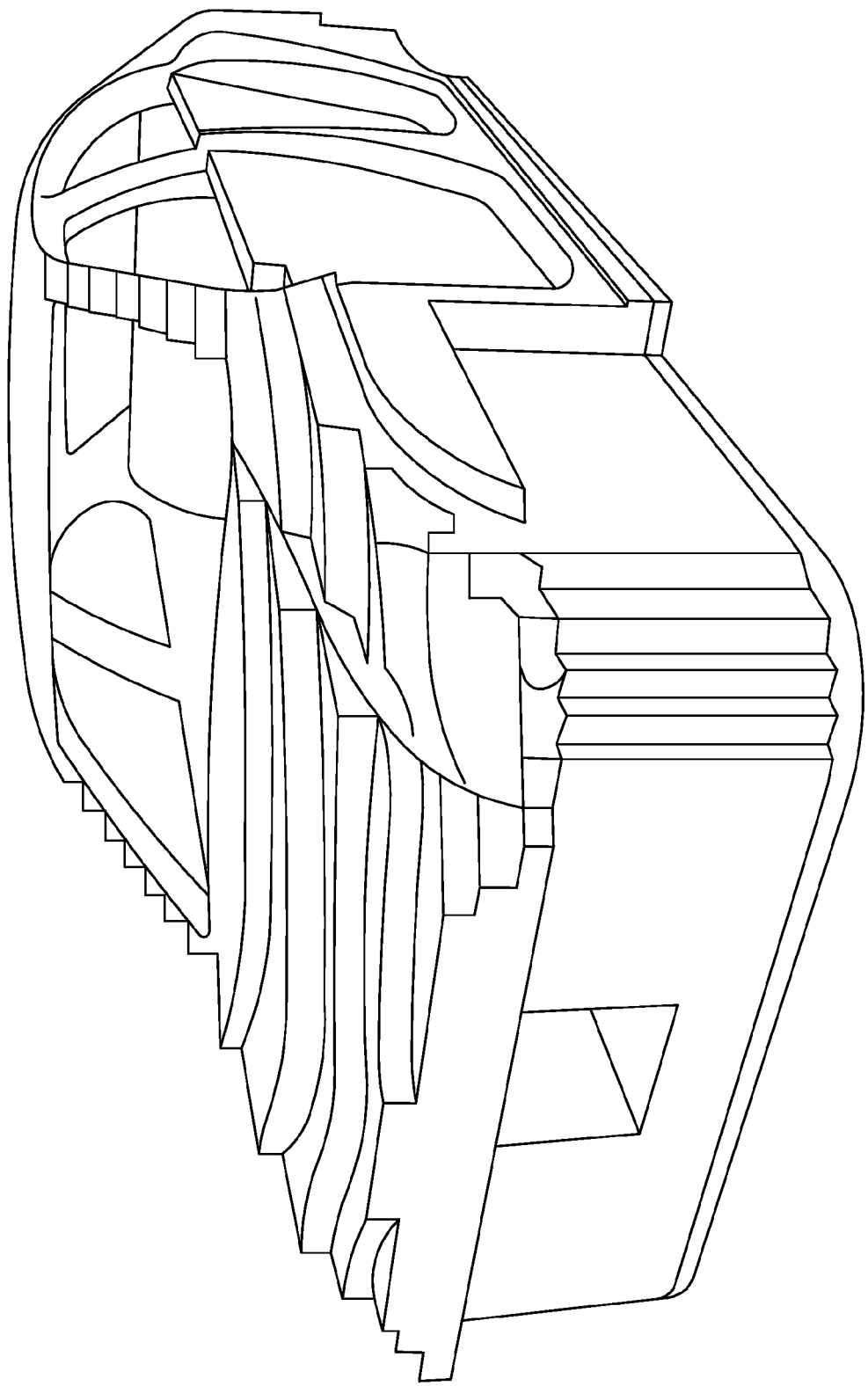
FIG. 6 depicts the exterior surfaces of an exemplary model vehicle after partial machining of the interconnected sections of FIG. 5.
Figure 7:
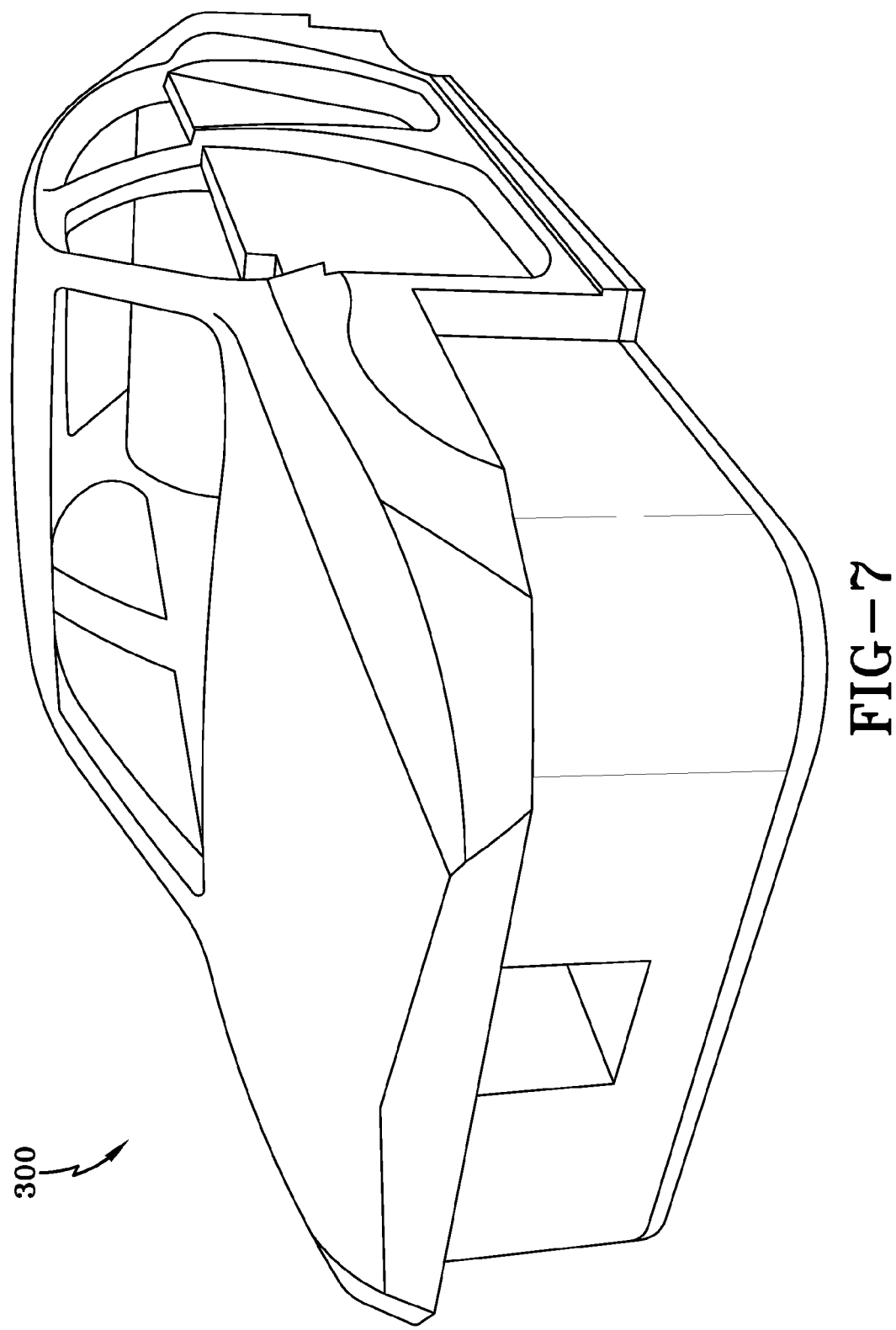
FIG. 7 shows the exemplary model vehicle of FIG. 6 after exterior machining has been completed.

The process of machining the exterior design surfaces of the exterior design surface sections 220, 225, 230 is represented in FIGS. 6-7. As shown in FIG. 6, the various design surface sections 220, 225, 230 have been subjected to some initial degree of machining, such that the general contour of the exterior design surfaces has begun to appear. FIG. 7 illustrates a fully machined model vehicle body 300, which comprises the model vehicle of FIG. 6 after machining of the exterior design surfaces has been completed. As shown, the exterior design surfaces now accurately represent the finished exterior contour of the subject vehicle. While the exact nature of each exterior design surface section may vary, it is important to note that the interlocked design surface sections are nonetheless collectively machined in place to form the exterior surfaces of the model vehicle body.

In alternative embodiments of the present invention, the design surface sections 220, 225, 230 may be assembled to and machined on a temporary fixture (not shown) instead of the base 200. The assembly, interlocking and collective machining of the interlocked design surface sections 220, 225, 230 occurs in substantially the same manner as described above—the fixture simply acts as a temporary stand-in for the base 200. In this case, once machining of the exterior design surfaces of the exterior design surface sections 220, 225, 230 is complete, the interlocked and machined design surface sections are preferably removed from the fixture and transferred/secured en masse to the base 200 (although separation, transfer and reassembly are also possible). Use of a temporary fixture as described may allow for work on the base and the exterior design surface sections of a model vehicle to proceed concurrently, rather than requiring the base to be completed prior to machining of the exterior design surface sections.

The backside surfaces and exterior design surfaces of a model vehicle constructed according to the present invention may be produced by any acceptable automated machining device operating under digital control. For example, a large CNC machine or a multi-axis robot equipped with an appropriate cutting tool may be used for this purpose.

A fully assembled model vehicle 375 may be observed in FIG. 8. The model vehicle 375 includes the fully machined vehicle body 300 of FIG. 7, as well as other vehicle components that may have been separately machined, cast, molded or otherwise formed. These components may be additional model components, or may be actual prototype or production vehicle components. For example, the model vehicle 375 is shown to include a windshield 305, instrument panel 310, outside mirror 315, front seats 320, rear seats 325, and rear deck lid 350. As would be understood by one of skill in the art, the interior may also include a steering wheel, pedals, shifter, and other controls or interior vehicle components, the full extent of which may depend on the purpose of the model.

As can also be observed in FIG. 8, the doors 260, 265 have been separated (cut) from the unitary design surface sections 220, 225 and provided with hinges 330, 335 and handles 340 so that the doors may be opened and closed in the same manner as an actual vehicle. It is possible that the doors 260, 265 may be separately machined and subsequently added to the driver and passenger side design surface sections 220, 225. However, it is believed that machining the door surfaces into the unitary driver and passenger side design surface sections 220, 225 and then subsequently removing the doors 260, 265, adds stability to the driver and passenger side design surface sections during machining and also results in a more accurate fit of the doors to the body.

One exemplary fastener assembly 400 that has been specially designed to connect design surface sections to a base of a model vehicle or to interlock various design surface sections of a model vehicle is depicted in FIGS. 9A-9E. As shown with most clarity in FIGS. 9A-9C, the fastener assembly 400 includes a substantially T-shaped base portion 405, a shoulder bolt 415 or similar threaded fastener, and a correspondingly threaded nut 420. The T-shaped base portion 405 includes a nut receiving recess 410 that receives and releasably retains the nut 420 during use of the fastener assembly. A bore 425 extends into the T-shaped base portion 405 and leads into the nut receiving recess 410.

Figure 9E:
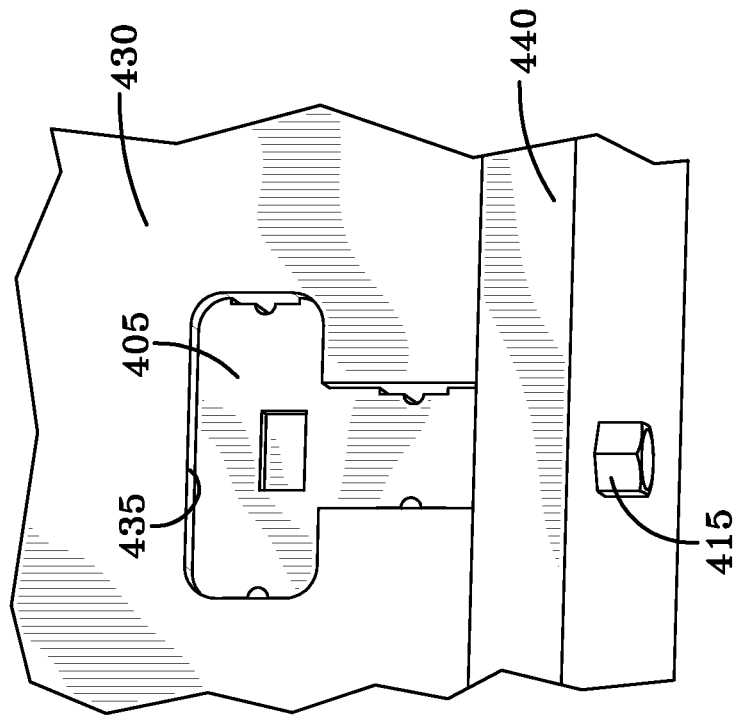
Figure 9D:
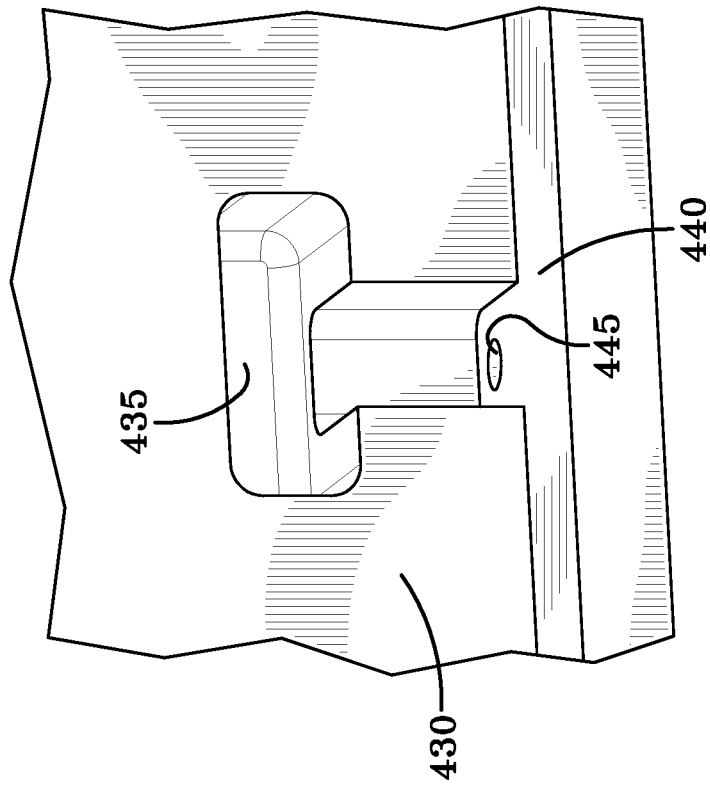

One exemplary use of the fastener assembly 400 is illustrated in FIGS. 9D-9E, wherein the fastener assembly is employed to secure a design surface section 430 to a base 440 of a model vehicle. More specifically, the design surface section 430 is provided with a receiving cavity 435 into which is inserted the T-shaped base portion 405 of the fastener assembly 400. The designs surface section 430 and the installed T-shaped base portion 405 sit on a top surface of the base 440. With the nut 420 placed in the nut receiving recess 410 of the T-shaped base portion 405, the shoulder bolt 415 is inserted through a hole 445 in the base 440 and the bore 425 in the T-shaped base portion, and threaded into the nut. Threading of the shoulder bolt 415 into the nut 420 draws the T-shaped base portion 405 and the design surface section 430 tightly against the base 440, thereby securing the design surface section thereto. A number of such fastener assemblies 400 may be positioned about a given design surface section for this purpose.

Another exemplary fastener assembly 450 that has been designed to interlock various design surface sections of a model vehicle is shown in FIGS. 10A-10F. As shown with most clarity in FIGS. 10A-10D, the fastener assembly 450 includes a base portion 455, a catch 460, and a locating pin 465. The base portion 455 is divided into two halves, with each half including a catch receiving cavity 470 and a locating pin receiving hole 475. One half of the base portion 455 receives and retains a male half 460a of the catch 460, while the other half of the base portion receives and retains a female half 460b of the catch. The locating pin 465 is initially installed into the receiving hole 475 in one of the base portion halves. In this particular example, the locating pin 465 is initially installed into the receiving hole 475 in the base portion half that includes the male half 60a of the catch 460, but the opposite may also be true.

Basic operation of the fastener assembly 450 is depicted in FIG. 10C. As shown, when the two halves of the fastener assembly are brought together, the locating pin 465 installed to the first assembly half enters the locating pin receiving hole 475 in the opposite assembly half, to help ensure proper alignment therebetween. Additionally, a protruding portion 480 of the male half 460a of the catch 460 snaps into and is retained by a corresponding female receiving portion 485 of the female half 460b of the catch. The interaction of the catch halves 460a, 460b tightly pulls together the two base portions 455 as shown in FIG. 10D.

Referring now to FIGS. 10E-10F, use of the fastener assembly 450 to interlock mating design surface sections 490, 495 of a model vehicle is illustrated. In FIG. 10E, it can be seen that one half of a plurality of fastener assemblies 450 (as indicated by the arrows) have been inserted into corresponding pockets 500 provided in one of the design surface sections 490 to be interlocked. Although not visible in FIG. 10E, it should be understood that mating fastener assembly halves are correspondingly installed in the other design surface section 495 with which the first design surface section 490 is to be interlocked. The pockets 500 may be carved, molded or otherwise placed in the design surface sections 490, 495 by any known technique. The fastener assembly halves may be retained in the pockets 500 by any acceptable means. In one exemplary embodiment, the fastener halves are retained in the pockets 500 by an adhesive. The base portions 455 of the fastener assembly 450 may include features, such as the channels shown, to help retain an adhesive and bond the base portions to the design surface section material.

Initial engagement of the fastener assembly halves installed in the design surface sections 490, 495 is depicted in FIG. 10F. As shown, initial engagement preferably, but not necessarily, involves entry of the locating pin 465 installed in one fastener assembly half into the open locating pin receiving hole 475 of the corresponding fastener assembly half. While locating pin engagement could also occur concurrently with or subsequent to initial catch engagement, it is believed that a first engagement of the locating pin assists in proper alignment of the fastener assemblies and the design surface sections. A should be apparent, a further movement of one design surface section of FIG. 10F toward the other design surface section will result in engagement of the catch halves 460a, 460b, and a tight drawing together and securing of the fastener halves and the design surface sections 490, 495.

It can be understood from the foregoing description of exemplary embodiments and the accompanying drawing figures that systems and methods of the present invention substitute large and unitary model vehicle sections for the greater number of individual model vehicle components used in known model vehicle construction techniques. For example, the overall number of components used to produce the model vehicle of FIG. 8 is reduced by approximately 80% when the model vehicle is constructed according to the present invention instead of by the known technique represented in FIGS. 1A-1D and described above.

Further, unlike known model vehicle construction techniques that require the fabrication and assembly of a multitude of individual model components, the entire exterior surface of a model vehicle body constructed according to the present invention is created from the non-machined or substantially non-machined exterior portions of interlocked design surface sections. Therefore, it should be apparent that systems and methods of the present invention are able to significantly reduce the number of man and machine hours required to create a model vehicle, which also results in a reduced model cost.

While certain embodiments of the present invention are described in detail above, the scope of the invention is not to be considered limited by such disclosure, and modifications are possible without departing from the spirit of the invention as evidenced by the following claims:

What is claimed is:

1. A system for rapidly constructing a model vehicle, comprising:
    a base for receiving and supporting a plurality of exterior design surface sections;
    a plurality of individual exterior design surface sections adapted for mounting to said base and/or for connection to each other, said exterior design surface sections including a machinable exterior material from which exterior contours of a model vehicle body may be machined;
    a backside surface pre-machined into each of said exterior design surface sections, said backside surfaces cooperating to form at least a portion of a vehicle interior once said exterior design surface sections are properly located on said base;
    a mechanism for interlocking said exterior design surface sections while said exterior design surface sections are located on said base; and
    a numerically controlled machining device adapted to produce exterior contours of a model vehicle body from said exterior design surface sections while said exterior design surface sections are interlocked and located on said base;
    wherein, once said exterior contours are produced by said numerically controlled machining device, the interlocked exterior design surface sections cooperatively form a model vehicle having both interior and exterior features.

2. The system of claim 1, said base is a part of a temporary support fixture adapted to support said exterior design surface sections while said exterior contours are machined into said exterior design surface sections, said exterior design surface sections being subsequently transferable from said temporary support fixture to a permanent base.

3. The system of claim 2, wherein said exterior design surface sections are transferable to said permanent base as an interlocked, coherent unit.

4. The system of claim 1, further comprising at least one interior design surface section mounted to said base.

5. The system of claim 4, wherein said at least one interior design surface section is mounted to said base before said exterior design surface sections.

6. The system of claim 5, wherein said at least one interior design surface section includes features that correspond to features of said backside surfaces of said exterior design surface sections.

7. The system of claim 1, wherein said exterior design surface sections include a driver side design surface section, a passenger side design surface section and a roof design surface section.

8. The system of claim 7, wherein said driver side design surface section and said passenger side design surface section terminate substantially along a lengthwise centerline of the subject model vehicle.

9. The system of claim 7, wherein said driver side design surface section and said passenger side design surface section each include roof support pillar portions that mate with corresponding roof support pillar portions extending from said roof design surface section.

10. The system of claim 7, wherein said driver side design surface section and said passenger side design surface section each include the entirety of roof support pillar portions of the model vehicle, said roof pillar portions designed to mate with a roof design surface section.

11. The system of claim 7, wherein doors of said model vehicle are machined along with other portions of said driver side design surface section and said passenger side design surface section, and are subsequently separated therefrom prior to being hingedly remounted thereto.

12. The system of claim 1, wherein said base is constructed from a composite material having a foam core and plywood covering.

13. The system of claim 1, wherein said exterior design surface sections are at least partially comprised of a machinable foam material.

14. A system for rapid model vehicle construction, comprising:
    a base for receiving and supporting a plurality of interior and exterior design surface sections;
    at least one interior design surface section adapted for mounting to said base;
    a plurality of individual exterior design surface sections adapted for mounting to said base and/or for connection to each other, said exterior design surface sections including at least a driver side design surface section, a passenger side design surface section, and a roof design surface section, said exterior design surface sections comprised of a machinable foam material from which exterior contours of a model vehicle body may be machined;
    a backside surface pre-machined into each of said exterior design surface sections, said backside surfaces exhibiting one or more vehicle interior features and cooperating to form at least a portion of a vehicle interior once said exterior design surface sections are properly mounted to said base;
    fasteners for securing said exterior design surface sections to said base and for interlocking said exterior design surface sections to each other; and
    a numerically controlled machining device adapted to produce exterior contours of a model vehicle body from said exterior design surface sections while said exterior design surface sections are interlocked and mounted to said base;
    wherein, once said exterior contours are produced by said numerically controlled machining device, said interlocked exterior design surface sections and said at least one interior design surface section cooperatively form a model vehicle having both interior and exterior features.

* * * * *